A. LAURITZEN.
POTATO DIGGER.
APPLICATION FILED JUNE 16, 1916.

1,261,139.

Patented Apr. 2, 1918.
3 SHEETS—SHEET 1.

Fig. 1.

Witnesses

Albert Lauritzen, Inventor by

Attorneys

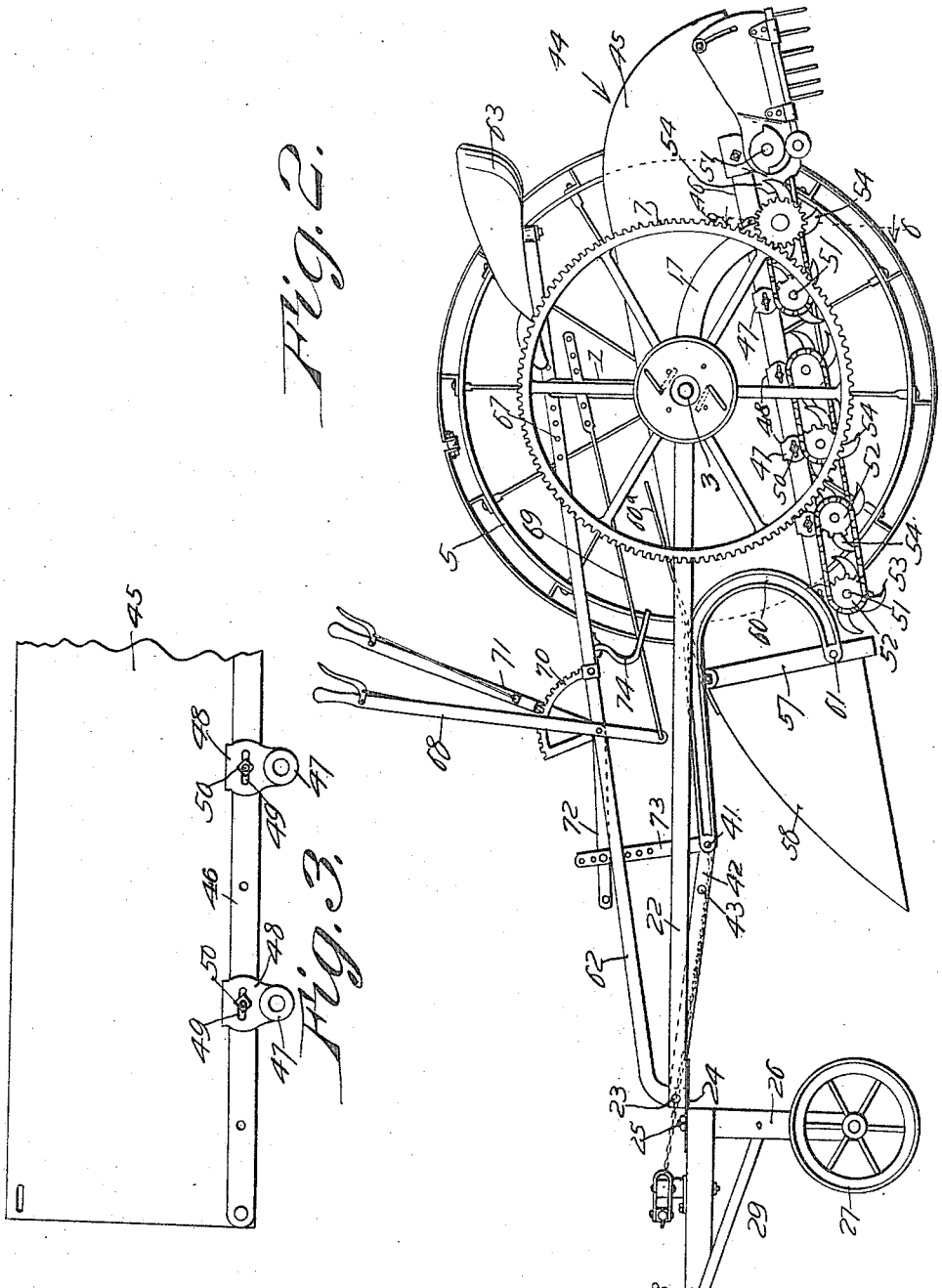

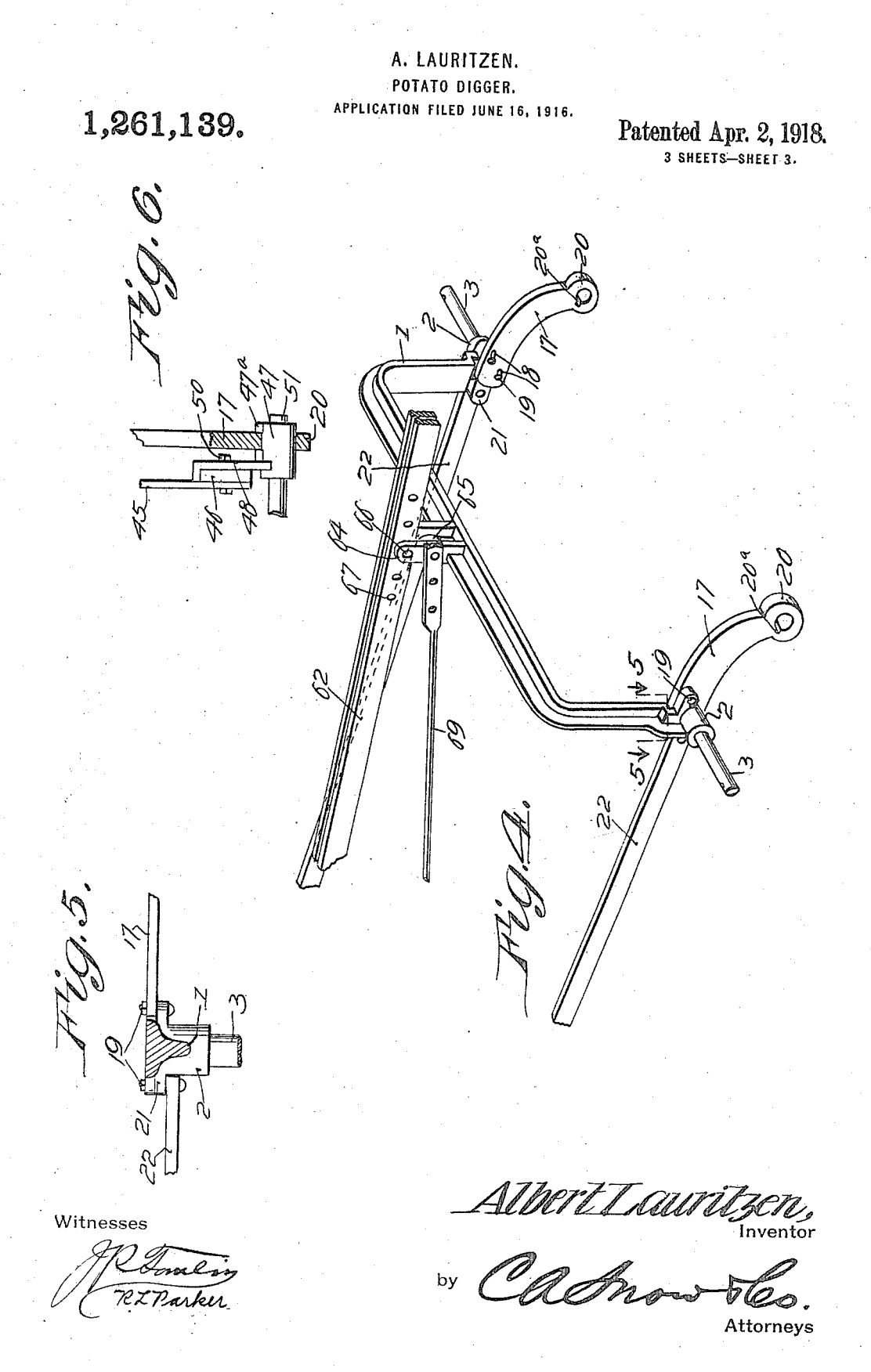

A. LAURITZEN.
POTATO DIGGER.
APPLICATION FILED JUNE 16, 1916.

1,261,139.

Patented Apr. 2, 1918.
3 SHEETS—SHEET 3.

Witnesses

Albert Lauritzen,
Inventor by C. A. Snow & Co.
Attorneys

UNITED STATES PATENT OFFICE.

ALBERT LAURITZEN, OF CHARLOTTE, MICHIGAN.

POTATO-DIGGER.

1,261,139. Specification of Letters Patent. Patented Apr. 2, 1918.

Application filed June 16, 1916. Serial No. 104,039.

*To all whom it may concern:*

Be it known that I, ALBERT LAURITZEN, a citizen of the United States, residing at Charlotte, in the county of Eaton and State of Michigan, have invented a new and useful Potato-Digger, of which the following is a specification.

The present invention appertains to potato diggers, and is particularly an improvement of the potato digger shown in the patent granted to J. F. Nielsen, and myself on January 9, 1912, No. 1,014,493.

It is the object of the invention to provide a potato digger of the same general construction as shown in said patent but having certain improvements, to enhance the utility and efficiency thereof.

One of the specific objects of the invention is the provision of novel means for mounting and controlling the trunk.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings:—

Figure 1 is a plan view of the machine.

Fig. 2 is a side elevation thereof, the near ground wheel being removed.

Fig. 3 is an enlarged detail view of the trunk, portions being broken away and others being removed.

Fig. 4 is a perspective view of the arch and accompanying parts, portions being broken away.

Fig. 5 is a sectional view taken on the line 5—5 of Fig. 4.

Fig. 6 is a sectional detail taken on the line 6—6 of Fig. 2.

In carrying out the invention, there is provided an arch 1 provided at its ends with heads 2 provided with outstanding gudgeons or pintles 3 upon which are mounted for rotation the hubs of the ground wheels 5. Driving gear wheels 7 are operated by the ground wheels.

The arch 1 carries the rear portion of the trunk, and for this purpose, a pair of rearwardly projecting and downwardly curved brackets 17 have their forward ends overlapping the inner face of the heads 2 and adjustably attached thereto. Thus, the brackets 17 have longitudinal slots 18 through which bolts 19 or other securing elements are engaged, said bolts being carried by the head 2 for clamping the brackets thereagainst. The rear free ends of the brackets 17 have eyes 20.

The heads 2 have forwardly projecting ears 21 to which are pivoted the rear ends of a pair of draft bars 22 which have their forward terminals converging toward one another, and pivoted, as at 23, to a coupling 24, which is in turn pivoted upon, as at 25, a forward arch or arched axle 26 having the small steering wheels 27 journaled to the ends thereof. The rear end of the tongue 28 is attached to the arched axle 26, and is also connected thereto by braces 29, whereby said axle 26 can be swung about a vertical axis for steering the machine.

A transverse bar 40 has its ends pivotally connected, as at 41, to the rear ends of a pair of rearwardly diverging bars 42, which have their forward ends engaging the pivot 23. The bars 42 are connected near their rear ends by a cross piece 43.

The trunk is designated generally by the numeral 44, and embodies a pair of upstanding side plates 45 having attached to their lower edges reinforcing bars 46 to each of which a longitudinal series of bearings 47 is attached. The bearings 47 have upstanding portions 48 overlapping the bars 46 and provided with elongated slots 49 through which bolts 50 or other securing elements extend. Said bolts engage the bars 46, and when tightened, serve to hold the bearings 47 in adjusted positions, it being noted that the bolts 50 when loosened permit the bearings 47 to be adjusted longitudinally.

Two of the bearings 47 are fitted in the eyes 20, the outer ends of the bearings 47 having outstanding lugs 47$^a$ to engage behind the eyes 20. Said eyes have notches 20$^a$ for the passage of the lugs 47$^a$ when the bearings 47 are assembled with the eyes at a predetermined angle, and when the bearings are applied to the eyes and rotated to normal position, they are locked in place. The inner ends of the bearings 47 have upstanding portions 48.

The trunk includes a grid for moving the potatoes rearwardly thereover, and for sifting dirt, stones, and other trash from the potatoes. This grid includes a longitudinal series of transverse shafts 51 journaled through the bearings 47, and sprocket wheels 52 are secured to the ends of the shafts 51 and are connected by sprocket chains 53 disposed in staggered relation at the opposite sides of the trunk, as seen in Fig. 1, whereby all of the shafts are rotated simultaneously in the same direction, (clockwise as seen in Fig. 2.) Mounted loosely upon the shafts 51 are disks 54 having hook-shaped fingers for working the potatoes rearwardly, although the disks of the last set are provided with sinuous edges, as seen at the rear end of Fig. 2.

The next to the last shaft 51 has the bearings 47 which are secured to the eyes 20, whereby to pivotally connect the rear portion of the trunk with the rearwardly projecting brackets 17 of the arch 1, which enables the forward end of the trunk to be swung upwardly and downwardly. Pinions 53ª are secured to the ends of the next to the last shaft 51 and mesh with the gear wheels 7, whereby when said gear wheels are rotated, the shafts of the grid are also rotated.

At the forward end of the trunk there is employed a U-shaped supporting bar or member 57, which is more fully disclosed in my co-pending application Serial No. 104,037 filed even date herewith, so that the bar 57 need not be illustrated or described in detail in this application. The limbs of the bar 57 are attached to the forward ends of the side plates 45 of the trunk, and have attached thereto the forwardly projecting colter plates or wings 58. Attached to the lower portion of the bar 57 is a forwardly projecting digging share 59. Attached to the upper ends of the bar 57 are rearwardly projecting rods 60ª converging toward one another over the grid, which serves to support the potato vines and direct them onto the grid, so as to prevent the vines from falling over the side plates of the trunk. The share 59 plows up the row of potatoes, and the colter plates or wings 58 serve to direct the soil and potatoes properly onto the forward end of the grid.

As a means for supporting the forward end of the trunk, a pair of rearwardly diverging beams or links 60 have their forward ends engaging the pivots 41 at the ends of the bar 40 and have their rear ends curved downwardly, and pivoted, as at 61, to the limbs of the member 57 adjacent the lower portion of said bar, whereby to pivotally connect the links 60 with the forward end of the trunk. The bars 46 also engage pivots 61. A pair of juxtaposed bars 62 have their forward ends engaging the pivot 23 and have secured upon their ends a seat 63 for the operator. The intermediate portion of the arch 1 has a pair of upstanding prongs or tongues 64 between which the bars 62 pass, and a roller 65 is mounted for rotation between the prongs 64 and supports the bars 62, whereby the arch 1 can move freely relative to the bars 62. A pin or other retaining element 66 can be engaged through apertures of the prongs 64 and through one of the series of apertures 67 with which the bars 62 are provided, whereby to hold the arch 1 at any fixed position relative to the bars 62. A hand lever 68 is fulcrumed to the bars 62 between their ends, and the lower end of the lever 68 is connected by a link or rod 69 with one of the prongs 64, there being preferably an adjustable connection between the link 69 and arch 1. The lever 68 is used for swinging the arch 1 to adjust the position of the rear end of the trunk, and a segment 70 is carried by the bars 62 for holding the lever 68 in any adjusted position. A bell crank lever 71 is also fulcrumed to the bars 62 adjacent the lever 68, both levers being readily operated by the operator positioned upon the seat 63, and the lower forwardly projecting arm 72 of the lever 71 is connected by an adjustable link or hanger 73 with the bar 40. A foot rest 74 is carried by the bars 62 in rear of the levers 68 and 71.

By adjusting the lever 71, the link 73 can be raised and lowered, to correspondingly adjust the bar 40 and forward ends of the links 60, it being noted that when the bar 40 is raised, the links 60 will pull the forward end of the trunk upwardly, whereas if the bar 40 is moved downwardly, the forward end of the trunk will drop or move downwardly to engage the ground. It is thus possible to control the forward end of the trunk, in order that the digging share 59 shall properly dig up the potatoes and direct them onto the forward end of the grid, and when the machine is moved from place to place, the forward end of the trunk can be raised above the ground. The disks of the grid in being rotated, will agitate the potatoes and foreign matter, and will sift the potatoes to clean them, and the potatoes drop from the rear end of the grid.

The rear portion of the trunk is raised and lowered by adjusting the hand lever 68. Thus, by swinging the lever 68, the arch 1 is swung backwardly and forwardly upon the trunnions 3 as fulcrums. When the arch 1 is swung forwardly, the brackets 17 are raised, to raise the rear portion of the trunk, and when the arch is moved rearwardly, the brackets 17 are moved downwardly to lower the rear portion of the trunk. By inserting the pin 66 through the prongs 64 in one of the apertures 67, the arch 1 can be held in any adjusted position, although it is possible for the operator to control the positions of both ends of the trunks by operating the levers 68 and 71.

From the foregoing, taken in connection with the drawings, it is believed that the advantages and attributes of the invention will be obvious to those skilled in the art, without further comment being necessary.

Having thus described the invention, what is claimed as new is:

1. A digger embodying a pivotally mounted trunk whose forward end is movable upwardly and downwardly, a member at the forward end of the trunk, ground engaging means carried by said member, adjusting means having a pivotal connection with said member, and the trunk having means engaging said pivotal connection.

2. A potato digger including a trunk embodying side plates and bars attached to the lower edges thereof, a U-shaped member, the limbs of said member having pivots, the forward ends of said bars engaging said pivots, a digging share attached to the lower portion of said member, and adjusting means engaged with said pivots for raising and lowering the forward end of the trunk.

3. A potato digger embodying a trunk, bearings carried thereby adjacent to the rear end thereof, supporting means having a pair of brackets provided with eyes, said bearings being engaged through said eyes, the bearings having lugs engaging the eyes to hold the bearings assembled therewith, said eyes having notches for the passage of said lugs, and means for raising and lowering the forward end of the trunk.

4. A potato digger embodying an arch, ground wheels applied to the ends of the arch for supporting it, rearwardly projecting brackets attached to the ends of said arch, draft members pivoted to the ends of said arch, a bar pivotally connected at its forward end with the draft members and seating upon the arch, a seat carried by said bar, means carried by said bar and connected to the arch for swinging it, a trunk pivotally connected adjacent its rear end with said brackets, and means carried by said bar and operatively connected with the forward end of the trunk for raising and lowering it.

5. A potato digger embodying an arch, ground wheels applied to the ends thereof for supporting it, rearwardly projecting brackets attached to the ends of the arch, an arched front axle having supporting wheels, a coupling member pivoted upon said axle, draft bars having their forward ends pivoted to said coupling member and having their rear ends pivotally connected with the ends of said arch, a bar having its forward end connected with the pivot of the forward ends of said bars and seating upon the arch, a seat carried by the second mentioned bar, means carried by the second mentioned bar and connected with said arch for swinging it, a trunk pivotally connected adjacent its rear end with said brackets, bars connected to the pivot of the forward ends of the aforesaid draft bars, links pivoted to the rear ends of the last mentioned bars and pivotally connected with the forward end of the trunk, and means carried by the second mentioned bar for raising and lowering said links.

In testimony that I claim the foregoing as my own, I have hereto affixed my signature in the presence of two witnesses.

ALBERT LAURITZEN.

Witnesses:
FRANK E. BEARD,
ALBERT L. GREEN.

Copies of this patent may be obtained for five cents each, by addressing the "Commissioner of Patents, Washington, D. C."